(12) United States Patent
Nagaishi et al.

(10) Patent No.: US 11,199,608 B2
(45) Date of Patent: Dec. 14, 2021

(54) ANTENNA, SENSOR, AND VEHICLE MOUNTED SYSTEM

(71) Applicant: HITACHI AUTOMOTIVE SYSTEMS, LTD., Ibaraki (JP)

(72) Inventors: Hideyuki Nagaishi, Tokyo (JP); Akira Kuriyama, Tokyo (JP); Akira Kitayama, Hitachinaka (JP); Hiroshi Kuroda, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 406 days.

(21) Appl. No.: 16/335,917

(22) PCT Filed: Aug. 3, 2017

(86) PCT No.: PCT/JP2017/028231
§ 371 (c)(1),
(2) Date: Mar. 22, 2019

(87) PCT Pub. No.: WO2018/066219
PCT Pub. Date: Apr. 12, 2018

(65) Prior Publication Data
US 2019/0310345 A1 Oct. 10, 2019

(30) Foreign Application Priority Data

Oct. 4, 2016 (JP) .............................. JP2016-196328

(51) Int. Cl.
*G01S 7/03* (2006.01)
*G01S 13/931* (2020.01)
(Continued)

(52) U.S. Cl.
CPC ................ *G01S 7/03* (2013.01); *G01S 13/93* (2013.01); *G01S 13/931* (2013.01);
(Continued)

(58) Field of Classification Search
CPC ...... H01Q 1/3233; H01Q 13/02; H01Q 13/06; H01Q 13/065; H01Q 19/08; H01Q 21/064
See application file for complete search history.

(56) References Cited

U.S. PATENT DOCUMENTS 4,187,507 A 2/1980 Crane et al.
4,888,597 A * 12/1989 Rebiez ............... H01Q 21/0087
343/778
(Continued)

FOREIGN PATENT DOCUMENTS

DE 102011055457 A 5/2013
GB 2438261 A 11/2007
(Continued)

OTHER PUBLICATIONS

Extended European Search Report dated Apr. 21, 2020 for the European Patent Application No. 17858059.3.
(Continued)

*Primary Examiner* — Peter M Bythrow
(74) *Attorney, Agent, or Firm* — Volpe Koenig

(57) ABSTRACT

The present invention is an antenna provided with: a plurality of radiating parts formed on a base plate; a waveguide tube inside of which radio waves emitted from the radiating parts propagate; a lens having a plurality of curved surfaces having a substantially hyperbolic shape and disposed in an opening of the waveguide tube; and a protruding part formed in a tapered shape between the plurality of radiating parts. The tip of the protruding part is formed at a position lower than an opening surface.

15 Claims, 11 Drawing Sheets

(51) Int. Cl.
*H01Q 1/32* (2006.01)
*H01Q 13/02* (2006.01)
*H01Q 19/06* (2006.01)
*H01Q 21/06* (2006.01)
*G01S 13/93* (2020.01)
*H01Q 19/08* (2006.01)

(52) U.S. Cl.
CPC ........... *H01Q 1/3233* (2013.01); *H01Q 13/02* (2013.01); *H01Q 19/06* (2013.01); *H01Q 19/08* (2013.01); *H01Q 21/06* (2013.01); *H01Q 21/064* (2013.01)

(56) References Cited

U.S. PATENT DOCUMENTS

| | | | | |
|---|---|---|---|---|
| 5,166,698 | A * | 11/1992 | Ashbaugh | H01Q 13/025 343/783 |
| 6,043,772 | A | 3/2000 | Voigtlaender et al. | |
| 6,208,313 | B1 * | 3/2001 | Frank | H01Q 1/246 343/776 |
| 7,583,074 | B1 * | 9/2009 | Lynch | G01S 13/89 324/120 |
| 8,390,403 | B1 * | 3/2013 | Schaffner | H01Q 13/02 333/250 |
| 10,333,209 | B2 * | 6/2019 | Schmalenberg | H01Q 13/085 |
| 2003/0098815 | A1 * | 5/2003 | Teshirogi | H01Q 13/20 343/772 |
| 2003/0201930 | A1 * | 10/2003 | Nagasaku | H01Q 23/00 342/175 |
| 2004/0108963 | A1 * | 6/2004 | Clymer | H01Q 3/08 343/837 |
| 2005/0001757 | A1 * | 1/2005 | Shinoda | H01Q 1/42 342/70 |
| 2005/0062664 | A1 * | 3/2005 | Hidai | H01Q 19/08 343/786 |
| 2006/0158369 | A1 * | 7/2006 | Shinoda | G01S 13/931 342/70 |
| 2006/0220974 | A1 * | 10/2006 | Sakakibara | H01Q 13/0225 343/772 |
| 2006/0290564 | A1 * | 12/2006 | Sasada | H01Q 15/24 342/70 |
| 2007/0139287 | A1 * | 6/2007 | Inomata | H01Q 13/02 343/786 |
| 2007/0212008 | A1 * | 9/2007 | Schoebel | H01Q 1/3233 385/129 |
| 2007/0241962 | A1 * | 10/2007 | Shinoda | H01Q 15/24 342/361 |
| 2007/0273599 | A1 * | 11/2007 | Haziza | H01Q 13/0233 343/772 |
| 2008/0117113 | A1 * | 5/2008 | Haziza | H01Q 21/08 343/786 |
| 2009/0267822 | A1 * | 10/2009 | Shinoda | G01S 7/352 342/70 |
| 2010/0060537 | A1 * | 3/2010 | Nagayama | H01Q 1/247 343/776 |
| 2012/0050094 | A1 | 3/2012 | Nakabayashi et al. | |
| 2013/0294729 | A1 * | 11/2013 | Layton | B82Y 20/00 385/40 |
| 2014/0085129 | A1 * | 3/2014 | Westerling | H01Q 1/225 342/124 |
| 2014/0218255 | A1 * | 8/2014 | Sanford | H01Q 15/16 343/837 |
| 2015/0116154 | A1 * | 4/2015 | Artemenko | H01Q 15/08 342/371 |
| 2015/0229023 | A1 * | 8/2015 | Abe | H01Q 21/0037 342/368 |
| 2015/0349415 | A1 * | 12/2015 | Iwanaka | H01Q 1/36 343/786 |
| 2016/0006129 | A1 * | 1/2016 | Haziza | H01Q 15/08 343/783 |
| 2016/0093956 | A1 * | 3/2016 | Abe | G01S 7/032 342/175 |
| 2016/0268693 | A1 | 9/2016 | Ding et al. | |
| 2017/0170561 | A1 * | 6/2017 | Simon | H01Q 5/45 |
| 2018/0267161 | A1 * | 9/2018 | Nagaishi | H01P 5/107 |
| 2019/0115666 | A1 * | 4/2019 | Ochiai | H01Q 17/001 |

FOREIGN PATENT DOCUMENTS

| | | |
|---|---|---|
| JP | S61-116422 A | 7/1986 |
| JP | H10-160838 A | 6/1998 |
| JP | 2000-228608 A | 8/2000 |
| JP | 2007-192804 A | 8/2007 |
| JP | 2012-052928 A | 3/2012 |
| JP | 2012-175680 A | 9/2012 |

OTHER PUBLICATIONS

International Search Report for PCT/JP2017/028231 A1, dated Oct. 24, 2017.

* cited by examiner

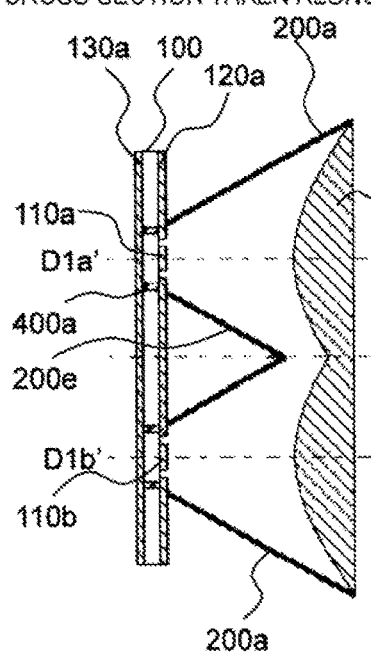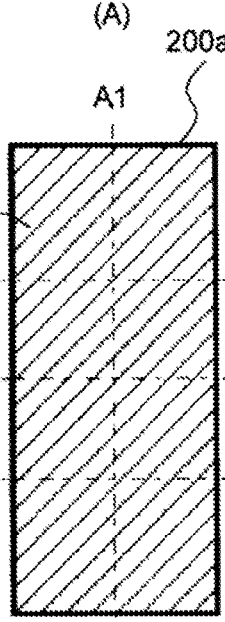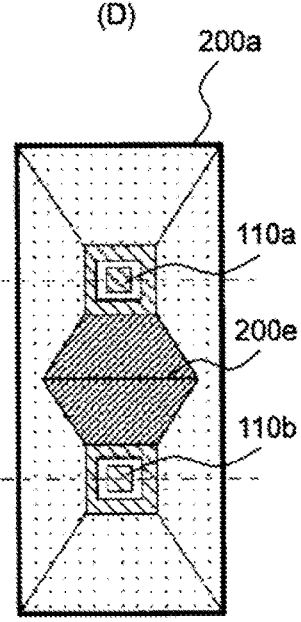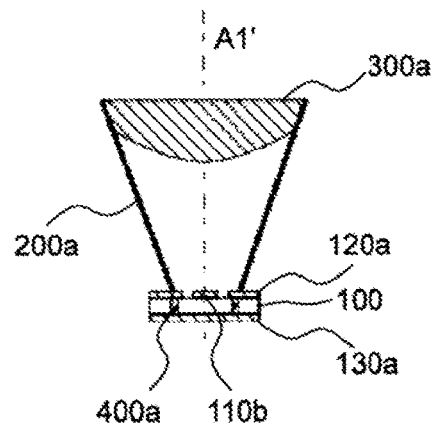
[FIG. 1]
(B) CROSS-SECTION TAKEN ALONG A1-A1'
(A)
(D)
(C) CROSS-SECTION TAKEN ALONG C1b-C1b'

[FIG. 2]
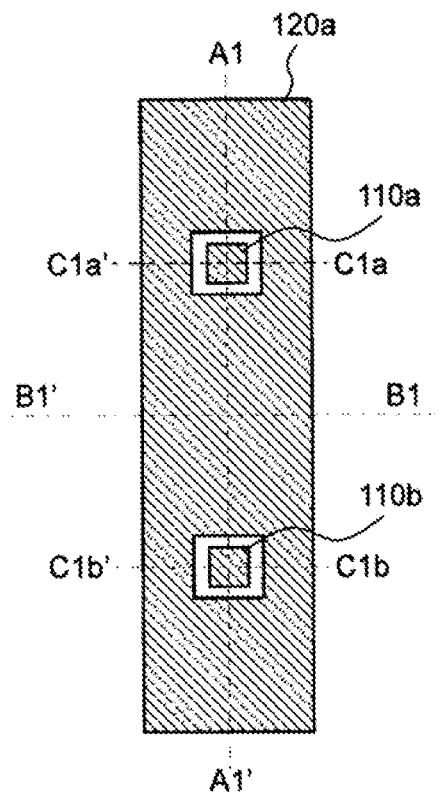
[FIG. 3]
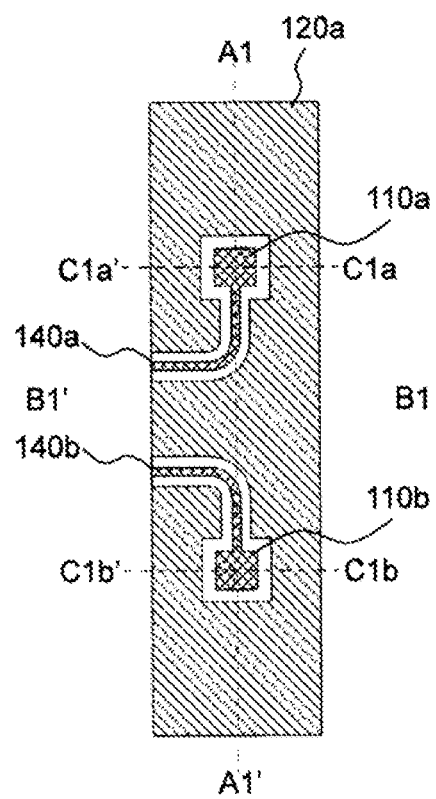

[FIG. 4]
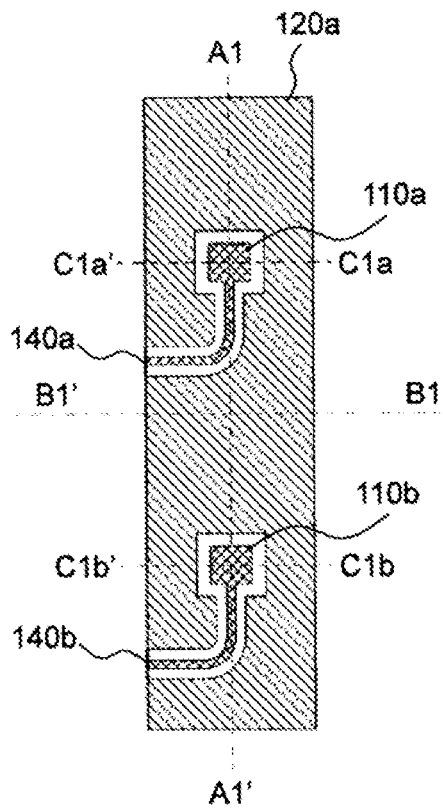
[FIG. 5]
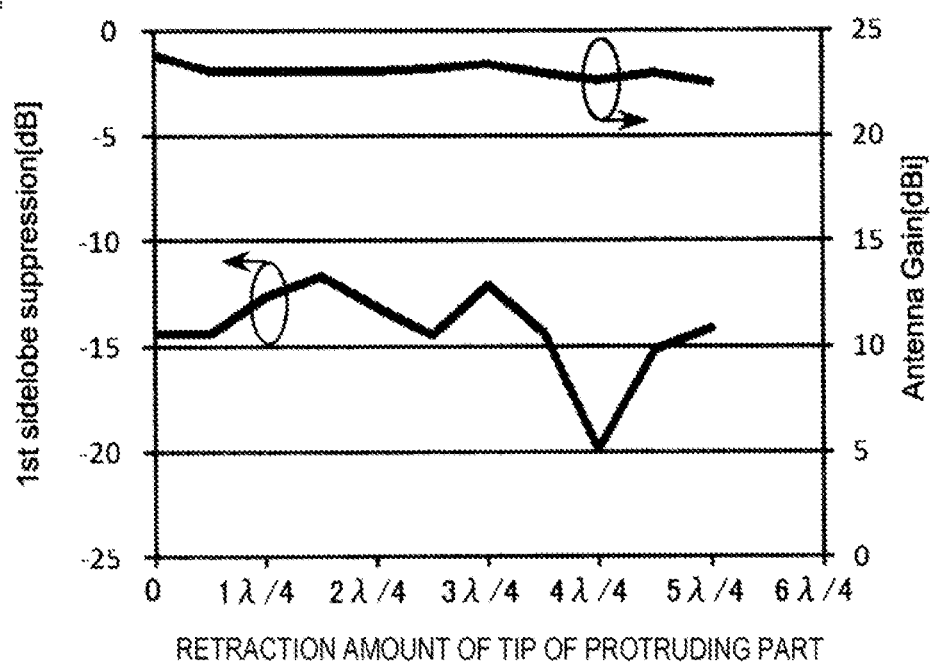

[FIG. 6]
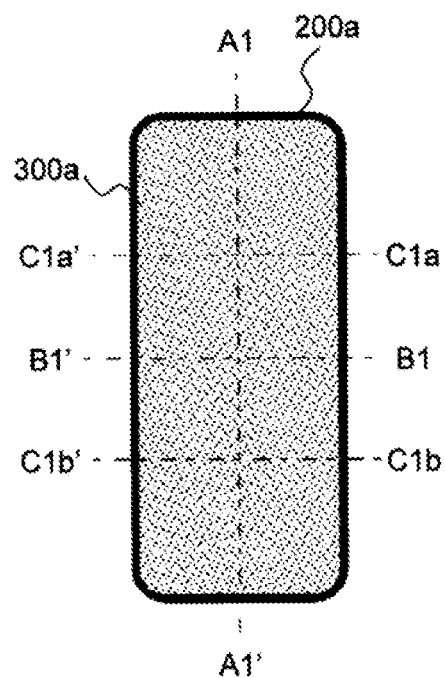
[FIG. 7]
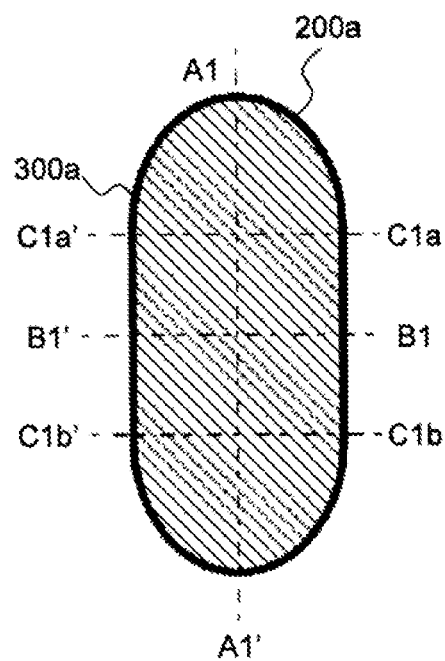

[FIG. 8]
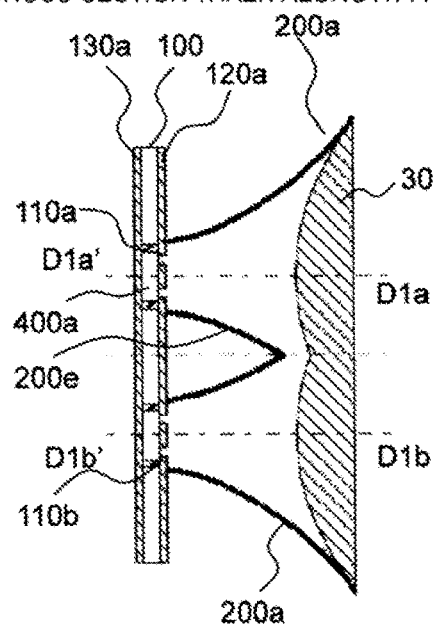
(B) CROSS-SECTION TAKEN ALONG A1-A1'
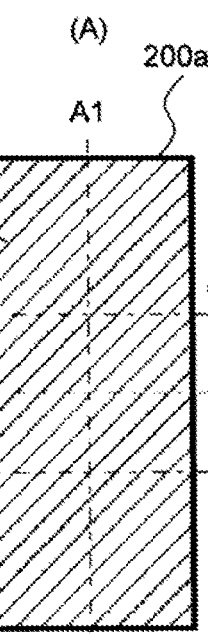
(A)
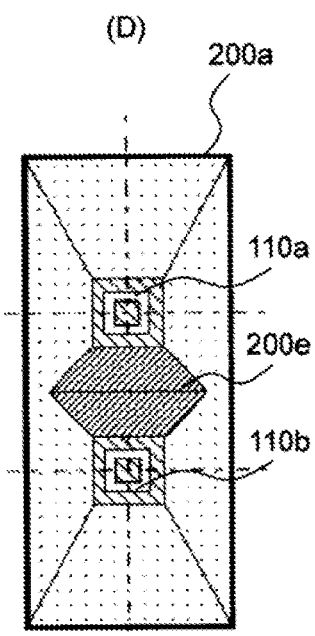
(D)
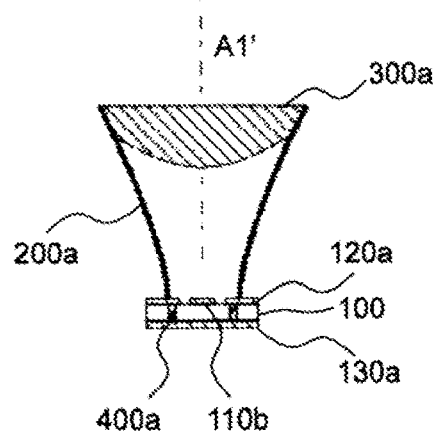
(C) CROSS-SECTION TAKEN ALONG C1b-C1b'

[FIG. 9]
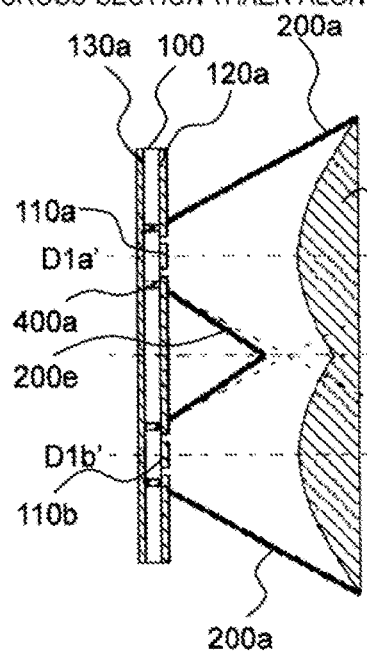
(B) CROSS-SECTION TAKEN ALONG A1-A1'
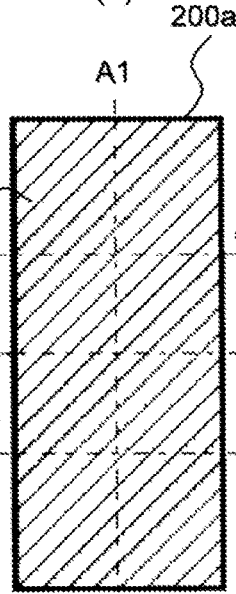
(A)
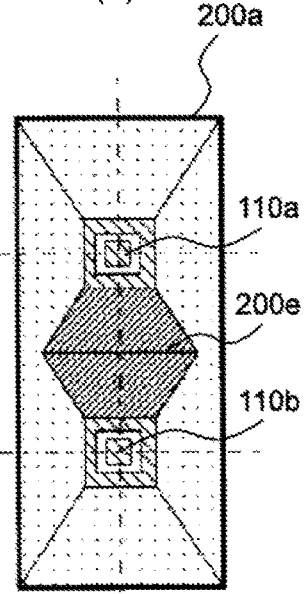
(D)
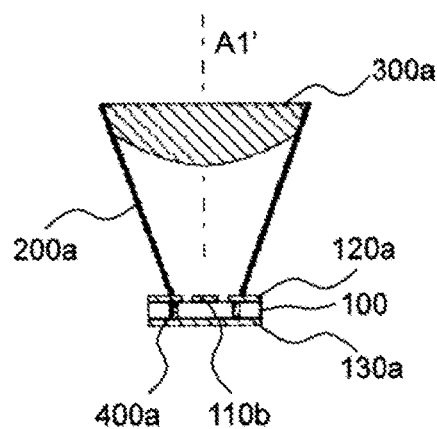
(C) CROSS-SECTION TAKEN ALONG C1b-C1b'

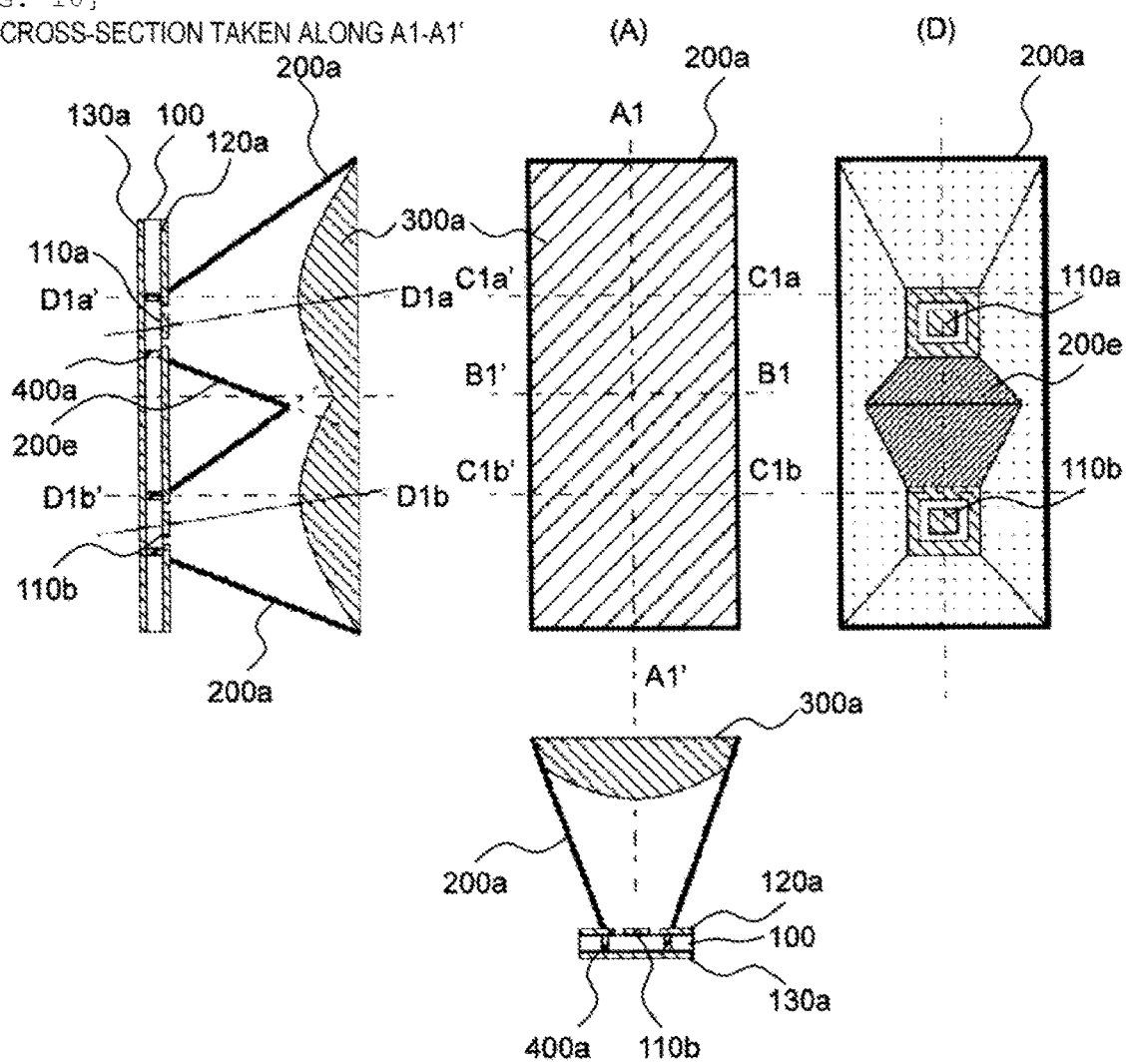
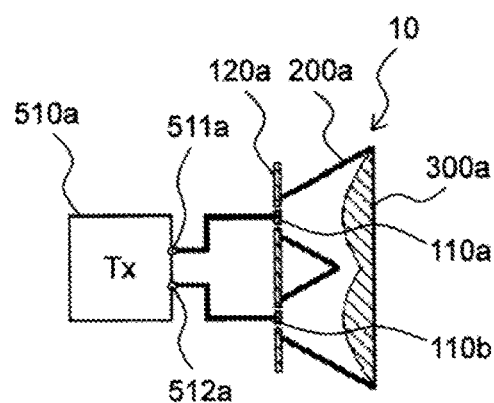

[FIG. 12]
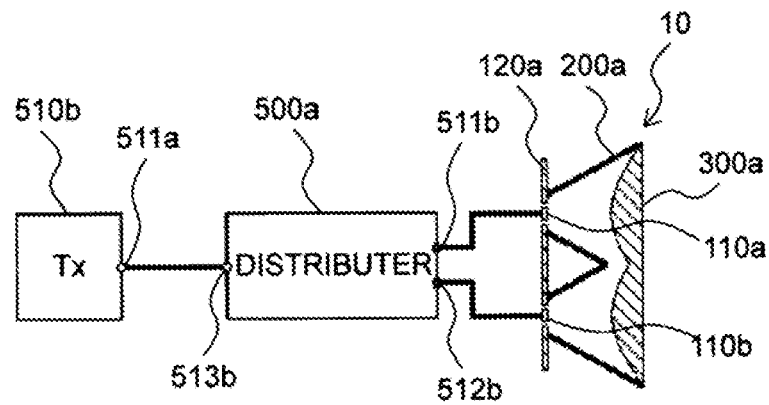
[FIG. 13]
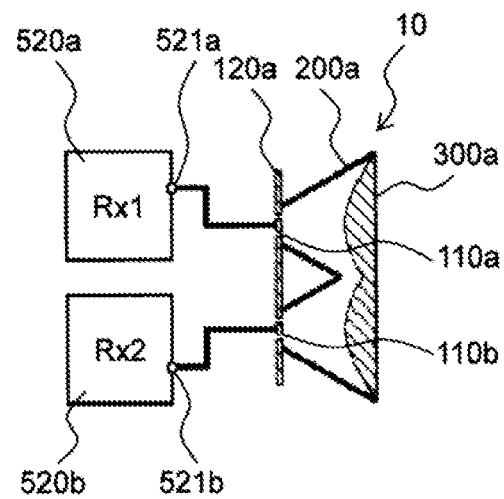
[FIG. 14]
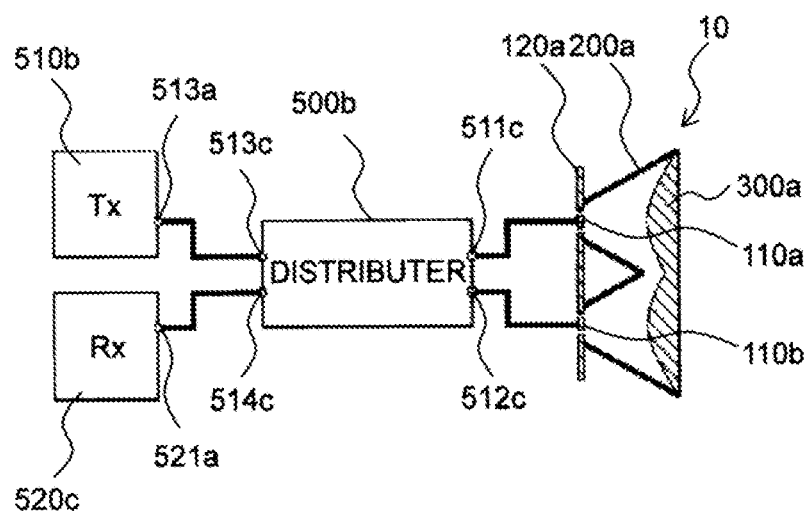

[FIG. 15]
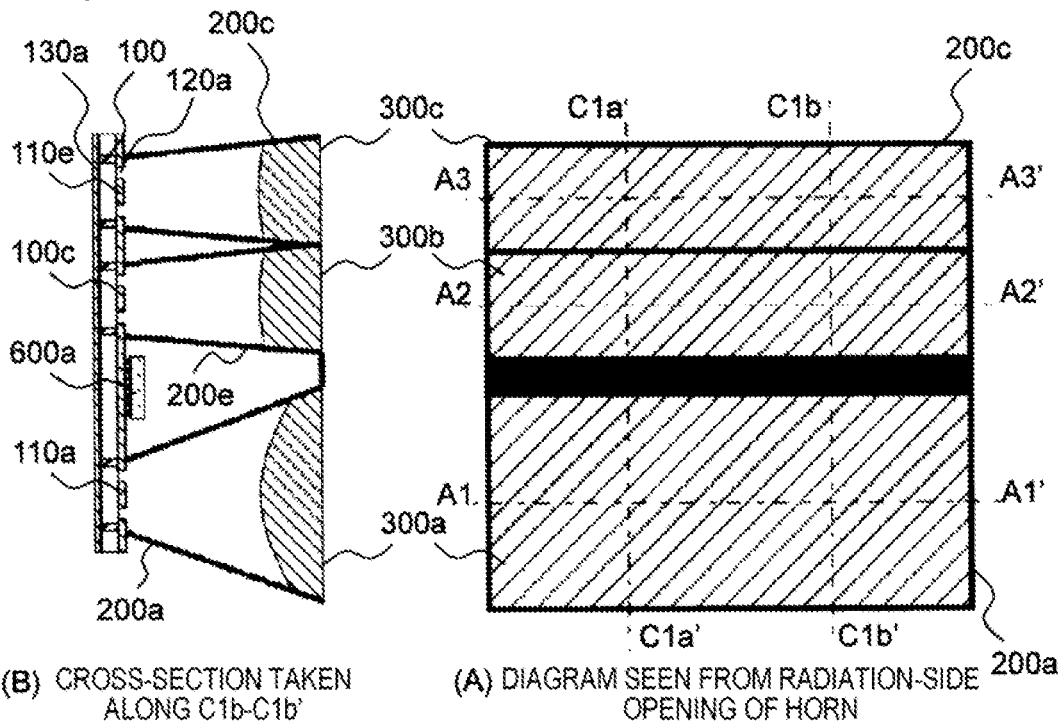
(B) CROSS-SECTION TAKEN ALONG C1b-C1b'
(A) DIAGRAM SEEN FROM RADIATION-SIDE OPENING OF HORN
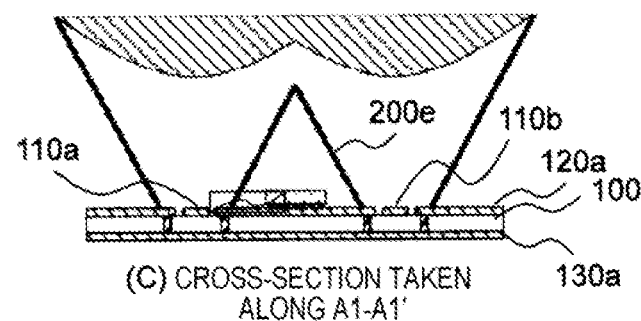
(C) CROSS-SECTION TAKEN ALONG A1-A1'
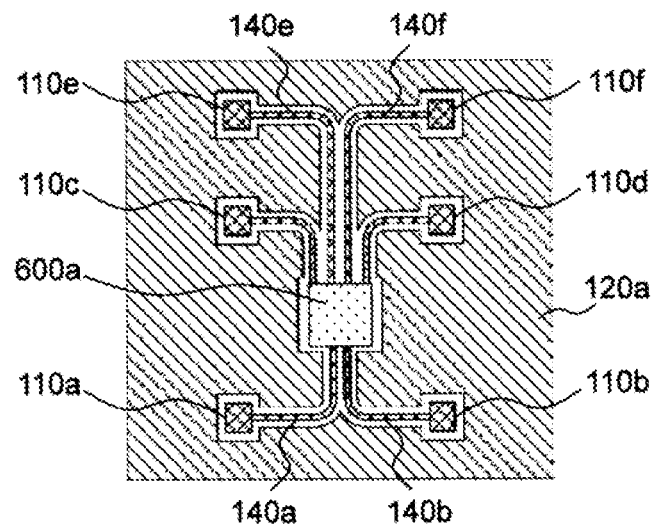
(D) FIRST SURFACE OF DIELECTRIC SUBSTRATE 100

[FIG. 16A]
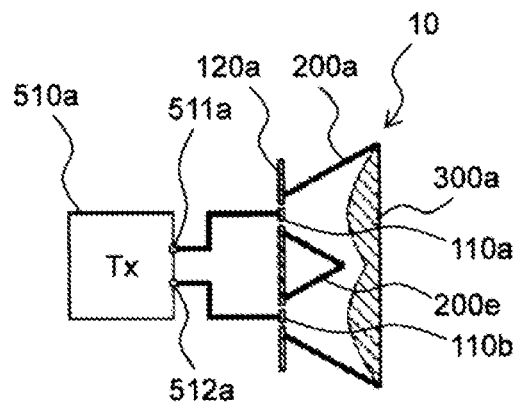
[FIG. 16B]
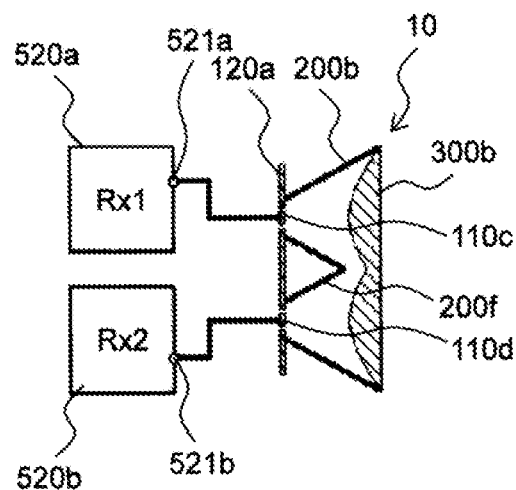
[FIG. 16C]
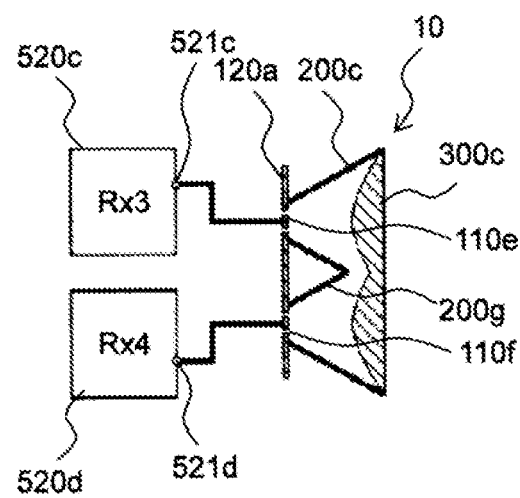

[FIG. 17]
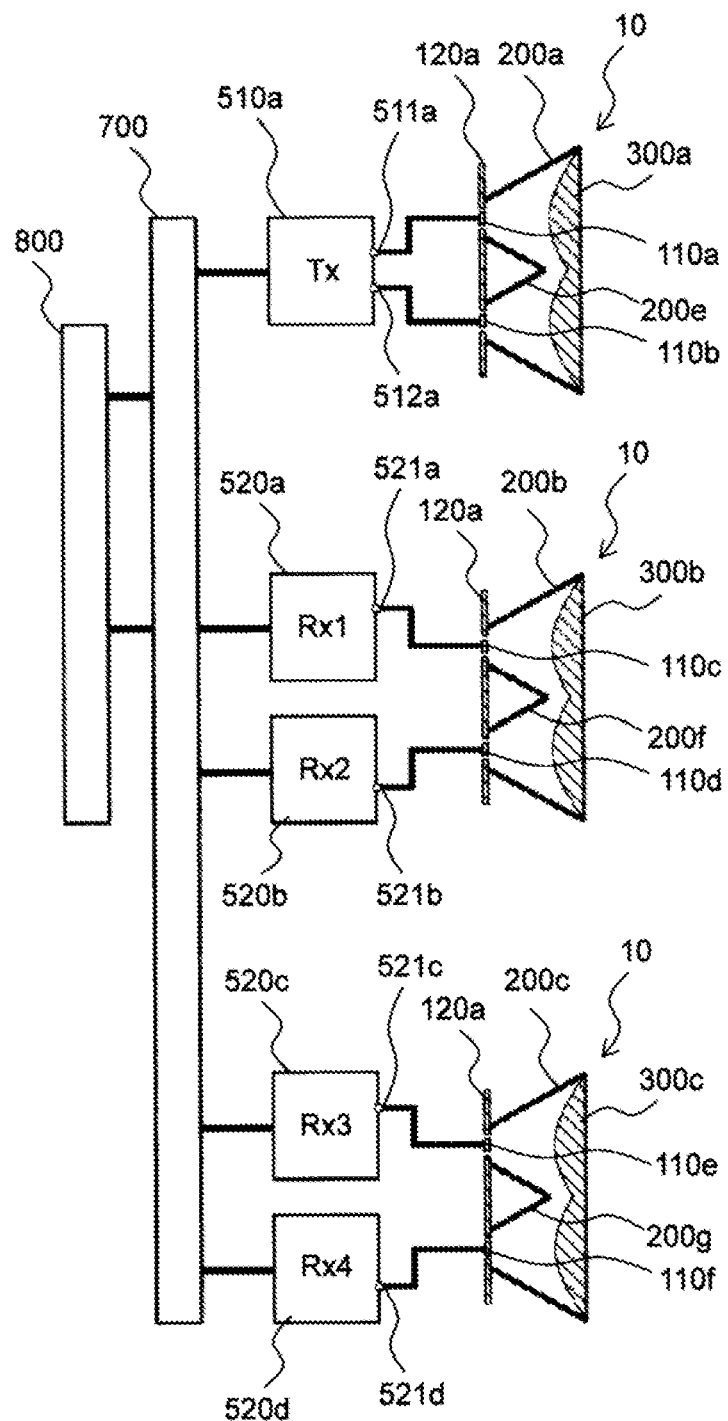

ANTENNA, SENSOR, AND VEHICLE MOUNTED SYSTEM

INCORPORATION BY REFERENCE

This application claims the priority of Japanese Patent Application No. 2016-196328, filed on Oct. 4, 2016, the content of which is incorporated herein by reference.

TECHNICAL FIELD

The present invention relates to an antenna for generating a flat beam, a sensor, and a vehicle mounted system.

BACKGROUND ART

There are Doppler sensors or radars using radio waves, as surrounding situation detection sensors for safe navigation and safe operation of automobiles, railways, infrastructure equipment and the like. For the sake of simplicity, Doppler sensors for automobiles will be described.

For automobiles, for realizing safe driving support and automatic driving, a plurality of sensors covering all areas, such as a forward long distance, a forward middle distance, a forward short distance, a side, and a rearward middle distance, around an automobile. Therefore, it is possible to detect various objects such as a front obstacle, a preceding vehicle, a rear vehicle, and a person, according to the driving scene.

As background of the present technique, there are JP-A-2012-52928, JP-A-2000-228608, JP-A-10-160838, and JP-A-2007-192804.

JP-A-2012-52928 discloses an antenna that generates a flat beam by setting the aspect ratio of the number of antenna elements forming an opening surface to a different number. A patch array antenna disclosed in JP-A-2012-52928 can suppress unnecessary radiation (side lobes) by controlling power emitted from each patch element and distributing the power intensively (for example, in Taylor distribution) near the center of the antenna opening surface. However, in the antenna disclosed in JP-A-2012-52928, as the antenna gain is increased, the area of an opening is larger and the feed line for supplying power to the antenna element is longer, so there is a problem that the antenna gain decreases due to the loss of the feed line.

JP-A-2000-228608 discloses an antenna including a primary radiator configured with a patch antenna and a metal horn, and a dielectric lens, in which the primary radiator is disposed at the focal position of the dielectric lens. JP-A-10-160838 discloses an antenna that collects radio waves emitted from a power feeding unit with a dielectric lens. The antennas disclosed in JP-A-2000-228608 and JP-A-10-160838 collect radio waves with the dielectric lens or the horn to improve the antenna gain.

JP-A-2007-192804 discloses an antenna in which metal horns are disposed in an array. In the antenna disclosed in JP-A-2007-192804, a desired area of an opening is realized by combining metal horns disposed in an array. By array-shaped division, the length of the antenna is reduced with a shallow taper angle of the metal horn. The radio field strength near the metal of the horn opening surface is low. Therefore, when the antenna opening surface is configured with a plurality of horns, a divided power distribution similar to the divided-horn structure is formed, and a plurality of power peaks are discretely arranged on the antenna opening surface. In particular, when dividing the antenna opening surface into two parts, the power near the center of the antenna opening surface decreases, so it is difficult to distribute the power distribution in a Taylor distribution and it is not possible to suppress unnecessary radiation (side lobes).

SUMMARY OF INVENTION

Technical Problem

For Doppler sensors for automobiles, the beam shape of radio wave transmitted or received from the antenna is preferably a flat shape which is wide in the horizontal direction and narrow in the vertical direction. This is because it is desired to widen the viewing angle with respect to the object in the horizontal direction, but it is desired to reduce noise due to unnecessary radiation from the ground (load clutter noise) in the vertical direction. Therefore, by increasing the detection sensitivity of the reception signal, an obstacle in the distance is detected.

However, if the structure disclosed in JP-A-2000-228608 is adopted in order to reduce the loss due to the feed line disclosed in JP-A-2012-52928, the primary radiator is disposed at a position away from the dielectric lens by the focal length. In the antennas disclosed in JP-A-2000-228608 and JP-A-10-160838, the lens focal length is increased by the opening size and the lens refractive index. Therefore, in a structure in which radio waves emitted from the primary radiator or the power feeding unit are collected with a single dielectric lens, there is a problem that the antenna size cannot be reduced to be equal to or smaller than the focal length of the dielectric lens. Further, radio waves emitted from a circular dielectric lens have a substantially isotropic beam shape, and there is a problem that a flat beam cannot be generated.

As one solution for reducing the size of the horn antenna, there is an array-shaped division antenna structure disclosed in JP-A-2007-192804. In order to obtain a desired narrow angle radiation beam, it is necessary to make the taper angle of the metal horn shallow such that the radio wave phase on the opening surface can be aligned on a flat surface more. In the configuration in which the antenna opening surface is divided into a plurality of parts, even if the taper angle of the metal horn is set to be the same, the length of each horn antenna can be shortened according to the number of divisions, and the size of the antenna can be reduced.

However, if the opening surface is divided into an array, the number of radiation sources increases in proportion to the number of divisions, and a line for supplying a high frequency signal to each radiation source is required, and a loss due to the feed line shown in JP-A-2012-52928 occurs.

Therefore, there is a demand for an antenna capable of generating flat beams while achieving reduction of the antenna size and reduction of loss of a feed line.

Solution to Problem

A representative example of the invention disclosed in this application is as follows. That is, the present invention is an antenna provided with: a plurality of radiating parts formed on a base plate; a waveguide tube inside of which radio waves emitted from the radiating parts propagate; a lens having a plurality of curved surfaces of a substantially hyperbolic shape and disposed in an opening of the waveguide tube; and a protruding part formed in a tapered shape between the plurality of radiating parts. The tip of the protruding part is formed at a position lower than the opening surface.

Advantageous Effects of Invention

According to an aspect of the present invention, it is possible to form a Taylor distribution-like power distribution in which the radio field strength peaks in the vicinity of the lens center while miniaturizing the antenna for generating the flat beam. The problems, configurations, and effects other than those described above will be clarified by the description of the following embodiments.

BRIEF DESCRIPTION OF DRAWINGS

FIG. 1 is a structural diagram of a flat beam generating antenna according to Embodiment 1.

FIG. 2 is a structural diagram of a dielectric base plate of Embodiment 1.

FIG. 3 is a structural diagram of the dielectric base plate of Embodiment 1.

FIG. 4 is a structural diagram of the dielectric base plate of Embodiment 1.

FIG. 5 is a diagram showing a radiation characteristic analysis result of the flat beam generating antenna of Embodiment 1.

FIG. 6 is a structural diagram of the flat beam generating antenna according to Embodiment 1.

FIG. 7 is a structural diagram of the flat beam generating antenna according to Embodiment 1.

FIG. 8 is a structural diagram of the flat beam generating antenna according to Embodiment 1.

FIG. 9 is a structural diagram of the flat beam generating antenna according to Embodiment 1.

FIG. 10 is a structural diagram of a flat beam generating antenna according to Embodiment 2.

FIG. 11 is a block diagram of a transmission side of a flat beam generating antenna according to Embodiment 3.

FIG. 12 is a block diagram of the transmission side of the flat beam generating antenna according to Embodiment 3.

FIG. 13 is a block diagram of a reception side of the flat beam generating antenna according to Embodiment 3.

FIG. 14 is a block diagram of a sensor having the flat beam generating antenna according to Embodiment 3.

FIG. 15 is a structural diagram of the sensor having the flat beam generating antenna according to Embodiment 3.

FIG. 16A is a block diagram of a sensor having the flat beam generating antenna according to Embodiment 3.

FIG. 16B is a block diagram of a sensor having the flat beam generating antenna according to Embodiment 3.

FIG. 16C is a block diagram of a sensor having the flat beam generating antenna according to Embodiment 3.

FIG. 17 is a block diagram of a vehicle mounted system having the sensor having the flat beam generating antenna according to Embodiment 3.

DESCRIPTION OF EMBODIMENTS

Embodiments of the present invention will be described in detail below with reference to the drawings. In the drawings for explaining embodiments of the invention, the same reference numerals are given to members having the same function, and repeated explanation thereof will be omitted.

Embodiment 1

FIG. 1 and FIG. 2 are structural diagrams of a flat beam generating array antenna according to Embodiment 1 of the present invention.

In the antenna shown in FIGS. 1 and 2, a first radiating part 110a and a second radiating part 110b are formed on a first surface of a dielectric base plate 100. A first conductor part 120a is formed on the first surface of the dielectric base plate 100, and a second conductor part 130a is formed on a second surface opposite to the first surface of the dielectric base plate 100. In addition, a through hole 400a for electrically connecting the conductor on the first surface of the dielectric base plate 100 and the conductor on the second surface is formed. On the first surface side of the dielectric base plate 100, a first horn 200a having at least an inner surface formed of a conductor is attached, and in the vicinity of the radiation-side opening of each first horn 200a, a first dielectric lens 300a having curved lens surfaces of the same number as the number of radiating parts is disposed. The first horn 200a is a waveguide tube and is formed in a tapered shape in at least one of a linear shape, a curved shape, a hyperbolic shape and an ellipsoidal sphere shape in order to radiate radio waves. The cross section of the first horn 200a monotonically expands from the end close to the radiating parts 110a and 110b toward the opening where radio waves are emitted. The first horn 200a is in contact with the dielectric lens 300a at the opening.

With such a configuration, the antenna of the present embodiment emits radio waves substantially in parallel with a first optical axis D1a-D1a' and a second optical axis D1b-D1b' of the first dielectric lens 300a.

A first imaginary line (longitudinal center line) A1-A1' passes through the center of the radiation-side opening of the first horn 200a and has the shortest length, and a second imaginary line (lateral center line) B1-B1' passes through the center of the first imaginary line A1-A1' and is orthogonal to the first imaginary line A1-A1'.

In the antenna of the present embodiment, a half of the first imaginary line A1-A1' (that is, the length in the A1-A1' direction of one radiation-side opening) is larger than the second imaginary line B1-B1'. In other words, in the present embodiment, the radiation-side opening of the first horn 200a has a rectangular shape in which the length in the direction (longitudinal direction) of the first imaginary line A1-A1' is longer than the length in the direction (lateral direction) of the second imaginary line B1-B1'.

A third imaginary line C1a-C1a' passes through the intersection point of the first imaginary line A1-A1' and the first optical axis D1a-D1a' and is orthogonal to the first imaginary line A1-A1'. A fourth imaginary line C1b-C1b' passes through the intersection of the first imaginary line A1-A1' and the second optical axis D1b-D1b' and is orthogonal to the first imaginary line A1-A1'.

FIG. 1(A) shows a shape of the antenna according to the present embodiment as seen from the radiation-side opening side of the first horn 200a. Further, FIG. 1(B) shows a cross-sectional shape of the antenna according to the present embodiment taken along the first imaginary line A1-A1'. Further, FIG. 1(C) shows a cross-sectional shape of the antenna according to the present embodiment taken along the fourth imaginary line C1b-C1b'. FIG. 1(D) shows the inner surface of the horn 200a as seen from the antenna opening side.

FIG. 2 shows a shape of the dielectric base plate 100 as viewed from the first surface side.

On the first surface of the dielectric base plate 100, the first conductor part 120a is formed to surround the first radiating part 110a and the second radiating part 110b at a certain distance from the first radiating part 110a and the second radiating part 110b. The first conductor part 120a is electrically connected to the second conductor part 130a formed on the second surface of the dielectric base plate 100 through the through hole 400*a*. Thus, the first conductor part 120*a* and the second conductor part 130*a* function as reference potential surface of the first radiating part 110*a* and the second radiating part 110*b*, and the first radiating part 110*a* and the second radiating part 110*b* operate as patch antennas, and emit radio waves from the first surface side of the dielectric base plate 100.

Further, the radiating part-side opening positioned on the opposite side to the radio wave travel direction of the radiation-side opening of the first horn 200*a* is disposed on the first surface side of the dielectric base plate 100 to enclose each one of the first radiating part 110*a* and the second radiating part 110*b*. In the horn 200*a*, a protruding part 200*e* having a surface which is line-symmetrical with the inner surfaces of the horn 200*a* with respect to the first optical axis D1*a*-D1*a'* and the second optical axis D1*b*-D1*b'* is disposed, and the first horn 200*a* and the protruding part 200*e* have a horn shape symmetrical about the second imaginary line B1-B1'. The antenna of the present embodiment is configured with the first radiating part 110*a*, the second radiating part 110*b*, the first horn 200*a*, and the protruding part 200*e*. It is desirable that the interval at which the through hole 400*a* is disposed is shorter than the length of a quarter of the wavelength within the dielectric base plate 100 of the radio wave to be used.

Since the potential of the first horn 200*a* and the potential of the protruding part 200*e* can be made equal to the reference potential of the radiating part by electrically connecting the first horn 200*a* and the protruding part 200*e* to the first conductor part 120*a*, it is possible to efficiently transmit radio waves emitted from the first radiating part 110*a* and the second radiating part 110*b* to the first horn 200*a*.

Further, the first dielectric lens 300*a* having a plurality of lens curved surfaces forms a convex shape in the direction of the radiating part-side opening, so the length of the first horn 200*a* from the radiating part-side opening to the radiation-side opening can be shortened, and the size of the antenna can be reduced. The first radiating part 110*a* and the second radiating part 110*b* are disposed at a position roughly coincident with the curved focal position of each lens of the first dielectric lens 300*a*.

With the above-described structure, in the case of the configuration having two radiating parts, since two lens curved surfaces are formed in the direction (longitudinal direction) of the first imaginary line A1-A1' of the first horn 200*a*, the diameter of one lens curved surface is half the opening size, and the focal length of the lens is about half.

The curved surface formed in the first dielectric lens 300*a* may have a hyperbolic shape in both the directions of the imaginary line A1-A1' and the second imaginary line B1-B1'.

Next, the operation of the antenna of the present embodiment will be described. Spherical radio waves emitted from the first radiating part 110*a* propagate through the first horn 200*a*, propagate through the first dielectric lens 300*a*, and are emitted to the space. Hemispherical radio waves are emitted from the first radiating part 110*a* and the second radiating part 110*b* of a patch antenna shape, pass through the tapered space configured with the inner surface of the protruding part 200*e* which is a surface symmetrical to the inner surface of the first horn 200*a* with respect to the first optical axis D1*a*-D1*a'* as the spherical radio waves, and are converted from the spherical waves to the plane waves by the first dielectric lens 300*a*.

As described above, with respect to radio waves emitted from the opening surface in the antenna for automobiles, it is necessary to intensively distribute power to the center of the opening surface, in order to suppress unnecessary radiation.

When the height of the protruding part 200*e* is made equal to the opening of the first horn 200*a*, the radio field strength decreases at the tip part of the protruding part 200*e*, so there is a place (notch) where the radio field strength decreases on the first imaginary line A1-A1' which is the center of the antenna opening surface. Since the radio field strength peak is divided into two parts with the imaginary line B1-B1' as the boundary, the power distribution of the opening surface is not Taylor distribution and causes unnecessary radiation to rise due to antenna radiation characteristics.

When the height of the protruding part 200*e* is made lower than the opening of the first horn 200*a* toward the radiating part side, the radio wave is diffracted at the tip of the protruding part 200*e* before entering the first dielectric lens 300*a*. Lowering the height of the protruding part 200*e* toward the radiating part side from the opening of the first horn 200*a* supplements the radio field strength on the imaginary line B1-B1' by diffraction, spherical waves from the two radiating parts 110*a* and 110*b* are synthesized in the space before the first dielectric lens, the radio wave vectors facing each other on the imaginary line B1-B1' cancel each other, and radio wave vectors in the same direction as the lens optical axis are synthesized.

It is possible to generate Taylor distribution-like power distribution in which the center of the opening surface peaks at the opening of the first horn 200*a*, by adjusting the height of the protruding part 200*e* (the amount of retraction of the tip of the protruding part from the opening surface of the first horn), the distance between the two radiating parts 110*a* and 110*b*, and the horn taper angle of the first horn 200*a* and the protruding part 200*e*.

FIG. 5 shows the calculation result of the maximum value of the antenna gain and the suppression amount of the first unnecessary radiation obtained by analyzing the antenna of the present embodiment in an electromagnetic field, with the height of the protruding part 200*e* (the amount of retraction of the tip of the protruding part from the opening surface of the first horn) as a variable.

Since the inner surface of the protruding part 200*e* is line symmetrical with the inner surface of the first horn 200*a* and the optical axis of the lens, the distance between the first radiating part 110*a* and the second radiating part 110*b* becomes shorter in association with the height of the protruding part 200*e*. By reducing the height of the protruding part 200*e*, the radio field strength on the imaginary line B1-B1' increases and side lobes are suppressed. In the simulation result shown in FIG. 5, the first side lobe (unnecessary radiation) can be reduced while suppressing the fluctuation of the gain of the main beam of the antenna in the range from 3λ/4 to 5λ/4 of the amount of retraction of the tip of the protruding part. In particular, when the amount of retraction of the tip of the protruding part is 1λ, the first side lobe (unnecessary radiation) can be improved by about 6 dB from −10 dB to −16 dB while suppressing the gain of the main beam of the antenna to fluctuation of about 0.5 dB.

By such operation, the antenna of the present embodiment suppresses unnecessary radiation while reducing the size of the antenna, and can radiate flat beam of which width in the direction (lateral direction) of the second imaginary line B1-B1' is wider than the width in the direction (longitudinal direction) of the first imaginary line A1-A1'.

Preferably, the electric field surface direction (the E plane direction) of the radio waves emitted from the first radiating part 110a and the second radiating part 110b is arranged in parallel to the first imaginary line A1-A1', so the shape of the beam emitted from the first horn 200a is easily narrowed in the direction of the first imaginary line A1-A1'.

FIGS. 3 and 4 are structural diagrams of a flat beam generating array antenna according to an embodiment of the present invention and show the shape as seen from the first surface side of the dielectric base plate 100. FIGS. 3 and 4 show variations of the feed line.

In the antenna shown in FIGS. 3 and 4, the first radiating part 110a is connected to a first feed line 140a and the second radiating part 110b is connected to a second feed line 140b. The first conductor part 120a is formed to surround the first radiating part 110a and the second radiating part 110b at a certain distance from the first radiating part 110a and the second radiating part 110b. In addition, the first conductor part 120a is formed at a certain distance from the first feed line 140a and the second feed line 140b.

With such a structure, the first radiating part 110a is supplied with the energy of radio waves emitted, through the first feed line 140a. Similarly, the second radiating part 110b is supplied with the energy of radio waves emitted, through the second feed line 140b. The antenna gain can be improved by the structure in which the first radiating part 110a is connected to the first feed line 140a and the second radiating part 110b is connected to the second feed line 140b.

In the antenna shown in FIG. 3, the first feed line 140a is connected to the first radiating part 110a from the lower direction, and the second feed line 140b is connected to the second radiating part 110b from the upward direction. On the other hand, in the antenna shown in FIG. 4, the first feed line 140a is connected to the first radiating part 110a from the lower direction, and the second feed line 140b is connected to the second radiating part 110b from the lower direction. Therefore, the phases of the signals supplied from the first feed line 140a and the second feed line 140b are differential in the antenna shown in FIG. 3 and are in phase in the antenna shown in FIG. 4. In this manner, by supplying signals, it is possible to align the directions of the radio waves emitted from the patch antenna. Further, the beams emitted from the radiation-side opening of the first horn 200a through the first dielectric lens 300a can be synthesized such that the gain becomes maximum in the front direction (the direction perpendicular to the radiation-side opening). By controlling the phases of the signals supplied from the first feed line 140a and the second feed line 140b, the maximum direction of the gain of the emitted beam can be set to any direction.

FIGS. 6, 7, and 8 are structural diagrams of a flat beam generating array antenna according to an embodiment of the present invention and show the shape as seen from the radiation-side opening of the first horn 200a. In FIGS. 6, 7, and 8, a modification embodiment in which the shape of the horn is different from those of the above-described embodiment will be described.

In the flat beam generating array antenna shown in FIG. the shape of the radiation-side opening of the first horn 200a is formed by four linear sides. In the antenna shown in FIG. 6, the shape of the radiation-side opening of the first horn 200a is such that the length in the direction of the first imaginary line A1-A1' is longer than the length in the direction of the third imaginary line C1a-C1a', and the antenna is formed into a shape in which four corners are curved (rounded rectangle).

In the antenna shown in FIG. 7, the shape of the radiation-side opening of the first horn 200a has an elliptical shape in which the long side in the direction of the first imaginary line A1-A1' is longer than the short side in the direction of the third imaginary line C1a-C1a'.

With respect to the shape of the radiation-side opening of the first horn 200a of the antenna of the present invention, the rectangular shape shown in FIG. 1 or the shape having the curved part shown in FIGS. 6 and 7 may be selected, depending on the ease of manufacturing and the radiation pattern of the flat beam to be generated.

In the antenna shown in FIG. 8, the shape of the side surface of a second horn 200b has a curved shape. According to the curved shape of the horn 200b, the protruding part 200e also has a curved shape symmetrical to the lens curved optical axis. The other configurations are the same as those of the antenna of the above-described embodiment. By making the inner surface of the horn 200b into a curved shape, the angle of the tip of the protruding part becomes an obtuse angle, so the diffraction amount can be increased.

Incidentally, the side surface shape of the horn of the antenna of the present invention may be the shapes (for example, a hyperbolic shape, an ellipsoidal sphere shape, or an irregular shape) other than the linear shape such as the first horn 200a (FIG. 1) or the curved shape such as the second horn 200b (FIG. 8), and even if the shape is selected according to the radiation pattern of the flat beam to be generated, the effect of the flat beam generating array antenna of the present invention is the same.

FIG. 9 is a structural diagram of a flat beam generating array antenna according to an embodiment of the present invention.

In the flat beam generating array antenna of the present embodiment, the inner surface of the protruding part 200e of the embodiment shown in FIG. 1 is provided on the second imaginary line B1-B1' side rather than the symmetrical lines of the inner surface of the first horn 200a with respect to the first optical axes D1a-D1a' and D1b-D1b'. Radio waves emitted from the radiating part 110a propagate while maintaining the spherical wave centered on the radiating part in the first horn 200a, and the peak part of the radio field strength moves to the second imaginary line B1-B1' side. That is, the power distribution of the opening surface can be intensively distributed to the central part by adjusting the height of the protruding part.

Embodiment 2

FIG. 10 is a structural diagram of a flat beam generating array antenna according to Embodiment 2 of the present invention. In the flat beam generating array antenna of the Embodiment 2, the relative distance between the two radiating parts 110a and 110b and the relative distance between the two lens curved optical axes provided in the dielectric lens 300a are the same as those in Embodiment 1 (FIG. 1), but the structure is such that the dielectric lens 300a is slid along the first imaginary line A1-A1' of the antenna. In the configuration of the array antenna shown in FIG. 1, the beam is generated in the front direction of the dielectric base plate 100 by disposing the radiating parts in the vicinity of the focal position on the lens curved optical axis. However, as shown in FIG. 10, it is possible to tilt the beam in the direction opposite to the optical axis, by shifting the radiating parts from the optical axis. In the case where the antenna installation direction of the present invention is fixed, it is possible to change the radiation direction of the beam only by sliding the relative arrangement of the dielectric lens 300a.

Embodiment 3

Next, an embodiment of a sensor having the flat beam generating array antenna according to the above-described Embodiment 1 or 2 will be described with reference to FIGS. 11 to 17.

FIG. 11 is a block diagram of the transmitting side of the sensor having the flat beam generating array antenna according to the above-described Embodiment 1 or 2.

The sensor shown in FIG. 11 has a flat beam generating array antenna 10 and a first transmission circuit 510a. The first transmission circuit 510a has a first terminal 511a to which the first radiating part 110a is connected, and a second terminal 512a to which the second radiating part 110b is connected. The phase of the signal output from the first terminal 511a and the second terminal 512a is determined by the electric field surface direction generated in the first radiating part 110a and the second radiating part 110b and may be differential or in phase.

Next, the operations of the transmission unit of the sensor of the present embodiment will be described. A signal output from the first terminal 511a of the first transmission circuit 510a is input to the first radiating part 110a and emitted from the first dielectric lens 300a as radio waves. Similarly, a signal output from the second terminal 512a of the first transmission circuit 510a is input to the second radiating part 110b and emitted from the first dielectric lens 300a as radio waves.

The transmission unit of the sensor having the flat beam generating array antenna of the present embodiment can be applied to a sensor that measures the distance to an obstacle or the like, the relative speed of an obstacle or the like.

FIG. 12 is a block diagram of the transmitting side of the sensor having the flat beam generating array antenna according to the above-described Embodiment 1 or 2. In the present embodiment, an embodiment of a transmission side of a sensor feeding power to the flat beam generating array antenna through a distribution circuit will be described.

The sensor shown in FIG. 12 has the flat beam generating array antenna 10, a second transmission circuit 510b, and a first distribution circuit 500a. The second transmission circuit 510b includes a first output terminal 511a for outputting a signal. The first distribution circuit 500a includes a first terminal 511b, a second terminal 512b, and a third terminal 513b.

The third terminal 513b of the first distribution circuit 500a is connected to the first output terminal 511a of the second transmission circuit 510b, the first radiating part 110a is connected to the first terminal 511b of the first distribution circuit 500a, and the second radiating part 110b is connected to the second terminal 512b of the first distribution circuit 500a. The phase of the signal output from the first terminal 511b and the second terminal 512b is determined by the electric field surface direction generated in the first radiating part 110a and the second radiating part 110b and may be differential or in phase.

Next, the operation of the transmission unit of the sensor of the present embodiment will be described. The signal output from the first output terminal 511a of the second transmission circuit 510b is input to the third terminal 513b of the first distribution circuit 500a and adjusted to the desired phase and amplitude in the first distribution circuit 500a, and is output from the first terminal 511b and the second terminal 512b. The signal output from the first terminal 511b is input to the first radiating part 110a and emitted from the first dielectric lens 300a as radio waves. Similarly, the signal output from the second terminal 512b is input to the second radiating part 110b and emitted from the first dielectric lens 300a as radio waves.

The transmission unit of the sensor having the flat beam generating array antenna of the present embodiment can be applied to a sensor that measures the distance to an obstacle or the like, the relative speed of an obstacle or the like.

FIG. 13 is a block diagram of the receiving side of the sensor having the flat beam generating array antenna according to the above-described Embodiment 1 or 2. In the present embodiment, an embodiment of the receiving side of the sensor having the flat beam generating array antenna will be described.

The sensor shown in FIG. 13 has the flat beam generating array antenna 10, a first reception circuit 520a, and a second reception circuit 520b. The first reception circuit 520a has a first input terminal 521a to which the first radiating part 110a is connected and the second reception circuit 520b has a second input terminal 521b to which the second radiating part 110b is connected.

Next, the operation of the reception unit of the sensor of the present embodiment will be described. The radio waves input to the first dielectric lens 300a are converted into an electrical signal at the first radiating part 110a through the first dielectric lens 300a and are input to the first input terminal 521a of the first reception circuit 520a. At the same time, the radio waves input to the first dielectric lens 300a are converted into an electric signal at the second radiating part 110b through the first dielectric lens 300a, and are input to the second input terminal 521b of the first reception circuit 520a.

The reception unit of the sensor having the flat beam generating array antenna of the present embodiment can be applied to a sensor that measures the distance to an obstacle or the like, the relative speed of an obstacle or the like. Further, as described above, the flat beam generating array antenna of the present invention generates flat beam of which beam width in the longitudinal direction is wider than that in the lateral direction, so it is applicable to a sensor that measures the position (an angle from the horizontal plane) of an obstacle or the like in the vertical direction (the direction of the first imaginary line A1-A1' (not shown in FIG. 13)).

FIG. 14 is a block diagram of a sensor having the flat beam generating array antenna according to the above-described Embodiment 1 or 2. In the present embodiment, an embodiment of a sensor in which a transmission unit and a reception unit are connected to the flat beam generating array antenna through the network circuit will be described.

The sensor shown in FIG. 14 includes the flat beam generating array antenna 10, the second transmission circuit 510b, a third reception circuit 520c, and a first network circuit 500b. The second transmission circuit 510b includes a third output terminal 513a for outputting a signal. The first network circuit 500b includes a first terminal 511c, a second terminal 512c, a third terminal 513c, and a fourth terminal 514c. The first network circuit 500b distributes the signal input to the third terminal 513c, and outputs the distributed signal from the first terminal 511c and the second terminal 512c. In addition, the first network circuit 500b synthesizes the signals input to the first terminal 511c and the second terminal 512c, and outputs the synthesized signal from the fourth terminal 514c. As a typical example of an electric circuit of the first network circuit 500b, there are a rat race circuit and a hybrid circuit.

The third terminal 513c of the first network circuit 500b is connected to the first output terminal 511a of the second transmission circuit 510b, the fourth terminal 514c of the first network circuit 500b is connected to the first input terminal 521a of the third reception circuit 520c, the first radiating part 110a is connected to the first terminal 511c of the first network circuit 500b, and the second radiating part 110b is connected to the second terminal 512b of the first network circuit 500b.

Next, the operations of the transmission unit and the reception unit of the sensor of the present embodiment will be described. The signal output from the first output terminal 511a of the second transmission circuit 510b is input to the third terminal 513c of the first network circuit 500b and adjusted to the desired phase and amplitude in the first network circuit 500b, and is output from the first terminal 511c and the second terminal 512c. The signal output from the first terminal 511c is input to the first radiating part 110a and emitted from the dielectric lens 300a as radio waves. Similarly, the signal output from the second terminal 512c is input to the second radiating part 110b and emitted from the dielectric lens 300a as radio waves.

Radio waves in which the radio waves emitted from the radiating part 110a and the radio waves from the radiating part 110b are spatially synthesized are emitted after being transmitted and deflected by the first dielectric lens 300a and are reflected by obstacles or the like. The reflected radio waves are again transmitted and deflected by the first dielectric lens 300a and are converted into electrical signals at the first radiating part 110a and the second radiating part 110b.

The electric signal received by the first radiating part 110a is input to the first terminal 511c of the first network circuit 500b, and the electric signal received by the second radiating part 110b is input to the second terminal 512c of the first network circuit 500b. The first network circuit 500b adjusts the input signal to a desired phase and amplitude, outputs the signal from the fourth terminal 514c, and inputs the signal to the first input terminal 521a of the first reception circuit 520a.

The transmission unit and the reception unit of the sensor having the flat beam generating array antenna of the present embodiment can be applied to a sensor that measures the distance to an obstacle or the like and the relative speed of an obstacle or the like.

FIG. 15 is a structural diagram of the sensor having the flat beam generating array antenna according to the above-described Embodiment 1 or 2, and FIG. 16 is a block diagram of the sensor of the present embodiment. In the present embodiment, an embodiment of a sensor having a transmission unit, a transmitting antenna, a reception unit, and a receiving antenna will be described.

FIG. 15(A) shows the shape seen from the radiation-side opening side of the first horn 200a of the flat beam generating array antenna of the present embodiment, FIG. 15(B) shows the sectional shape along the third imaginary line C1a-C1a' of the flat beam generating antenna of the present embodiment, FIG. 15(C) shows the sectional shape along the first imaginary line A1-A1' of the flat beam generating array antenna of the present embodiment, and FIG. 15(D) shows a shape of the dielectric base plate 100 seen from the first surface side.

On the first surface (a surface where horns 200a, and 200b, 200c are installed) of the dielectric base plate 100, the first radiating part 110a, the second radiating part 110b, a third radiating part 110c, a fourth radiating part 110d, a fifth radiating part 110e, and a sixth radiating part 110f are disposed. The radiating parts 110a to 110f are connected to a semiconductor element 600a mounted on the first surface of the dielectric base plate 100 through feed lines 140a to 140f.

The semiconductor element 600a includes the first transmission circuit 510a, the first reception circuit 520a, the second reception circuit 520b, the third reception circuit 520c, and a fourth reception circuit 520d. The semiconductor element 600a may be disposed in a gap part between the first horn 200a, the second horn 200b, and the dielectric base plate 100. The semiconductor element 600a may be mounted on the second surface of the dielectric base plate 100. Further, two or more semiconductor elements 600a may be mounted on one or both of the first surface and the second surface of the dielectric base plate 100.

On the first surface of the dielectric base plate 100, the first horn 200a, the second horn 200b, and a third horn 200c are installed. The first to third horns 200a to 200c may be formed by connecting the same member or may be integrally formed.

Dielectric lenses 300a to 300c having hyperbolic lens curved surfaces are provided at the radiation-side openings of the horns 200a to 200c, respectively. The first to third dielectric lenses 300a to 300c may be formed by connecting the same member or may be integrally formed.

The first radiating part 110a, the second radiating part 110b, and the protruding part 200e are disposed to be enclosed in the radiating part-side opening of the first horn 200a, and are connected to the semiconductor element 600a by the first feed line 140a and the second feed line 140b. The third radiating part 110c, the fourth radiating part 110d, and a protruding part 200f are disposed to be enclosed in the radiating part-side opening of the second horn 200b, and are connected to the semiconductor element 600a by the third feed line 140c and the fourth feed line 140d. The fifth radiating part 110e, the sixth radiating part 110f, and a protruding part 200g are disposed to be enclosed in the radiating part-side opening of the third horn 200c, and are connected to the semiconductor element 600a by the fifth feed line 140e and the sixth feed line 140f.

The transmitting antenna and the receiving antenna may have the same size and shape, but it is preferable that the aspect ratio of the receiving antenna is larger.

As shown in FIG. 16A, the first transmission circuit 510a has the first terminal 511a to which the first radiating part 110a is connected, and the second terminal 512a to which the second radiating part 110b is connected. The phase of the signal output from the first terminal 511a and the second terminal 512a is determined by the electric field surface direction generated in the first radiating part 110a and the second radiating part 110b and may be differential or in phase.

As shown in FIG. 16B, the first reception circuit 520a has the first input terminal 521a to which the third radiating part 110c is connected, and the second reception circuit 520b has the second input terminal 521b to which the fourth radiating part 110d is connected.

As shown in FIG. 16C, the third reception circuit 520c has a fourth input terminal 521d to which the fifth radiating part 110e is connected, and the fourth reception circuit 520d has a first input terminal 521e to which the sixth radiating part 110f is connected.

Next, the operations of the transmission unit and the reception unit of the sensor of the present embodiment will be described. A signal output from the first terminal 511a of the first transmission circuit 510a is input to the first radiating part 110a and emitted from the first dielectric lens 300a as radio waves. Similarly, a signal output from the second terminal 512a of the first transmission circuit 510a is input to the second radiating part 110b and emitted from the first dielectric lens 300a as radio waves. Radio waves emitted from the radiating part 110a and radio waves emitted from the radiating part 110b are spatially synthesized before and after transmitting through the first dielectric lens 300a and emitted.

The electromagnetic waves emitted from the first dielectric lens 300a are reflected by an obstacle or the like. The reflected radio waves are converted into electrical signals at the third radiating part 110c and the fourth radiating part 110d through the second dielectric lens 300b. The electrical signal generated by the third radiating part 110c is input to the first input terminal 521a of the first reception circuit 520a, and the electrical signal generated by the fourth radiating part 110d is input to the second input terminal 521b of the second reception circuit 520b.

The reflected radio waves are converted into electrical signals at the fifth radiating part 110e and the sixth radiating part 110f through the third dielectric lens 300c. The electrical signal generated by the fifth radiating part 110e is input to the third input terminal 521c of the third reception circuit 520c, and the electrical signal generated by the sixth radiating part 110f is input to the fourth input terminal 521d of the fourth reception circuit 520d.

The transmission unit and the reception unit of the sensor having the flat beam generating array antenna of the present embodiment can be applied to a sensor that measures the distance to an obstacle or the like, the relative speed of an obstacle or the like. Further, since the flat beam generating array antenna according to the present invention has a plurality of radiation-side openings arranged side by side horizontally and vertically, it is applicable to a sensor that measures the position in the vertical direction (angle from the horizontal plane) of an obstacle or the like in the vertical direction (the direction of the first imaginary line A1-A1') and the position in the horizontal direction (angle from the front direction) of an obstacle or the like in the horizontal direction (the direction of a sixth imaginary line C2-C2').

FIG. 17 is a block diagram of an embodiment of a vehicle mounted system having the sensor having the flat beam generating array antenna of the above-described embodiment.

The vehicle mounted system of the present embodiment includes the flat beam generating array antenna of the Embodiment 1 or 2, the first transmission circuit 510a, the first reception circuit 520a, the second reception circuit 520b, the third reception circuit 520c, the fourth reception circuit 520d, a signal processing circuit 700, and a vehicle control circuit 800.

The signal processing circuit 700 is connected to the first transmission circuit 510a, the first reception circuit 520a, the second reception circuit 520b, the third reception circuit 520c, and the fourth reception circuit 520d. The signal processing circuit 700 supplies the signal to be transmitted from the antenna to the first transmission circuit 510a, and processes the signals output from the first reception circuit 520a, the second reception circuit 520b, the third reception circuit 520c, and the fourth reception circuit 520d.

The vehicle control circuit 800 is connected to the signal processing circuit 700. The connection between the vehicle control circuit 800 and the signal processing circuit 700 may be wired with a cable or the like, or wireless such as a wireless local access network (LAN).

The vehicle control circuit 800 has a function of controlling the operation of a moving body such as power train control and vehicle body control, according to the signal output from the signal processing circuit 700.

Next, the operations of the transmission unit and the reception unit of the sensor of the present embodiment will be described. The first transmission signal which is output from the signal processing circuit 700 and input to the first transmission circuit 510a is output as a second transmission signal from the first terminal 511a of the first transmission circuit 510a, input to the first radiating part 110a, and emitted from the first dielectric lens 300a as a transmission electromagnetic wave. Similarly, the second transmission signal output from the second terminal 512a of the first transmission circuit 510a is input to the second radiating part 110b and emitted from the first dielectric lens 300a as a transmission electromagnetic wave.

The radio waves emitted from the first dielectric lens 300a are reflected by an obstacle or the like. The reflected radio waves are converted into a first reception signal at the third radiating part 110c through the second dielectric lens 300b and further input to the first input terminal 521a of the first reception circuit 520a. The first reception signal is output as a fifth reception signal from the first reception circuit 520a and input to the signal processing circuit 700.

At the same time, the reflected electromagnetic wave is converted into a second reception signal at the fourth radiating part 110d through the second dielectric lens 300b, and further input to the second input terminal 521b of the second reception circuit 520b. The second reception signal is output as a sixth reception signal from the second reception circuit 520b and input to the signal processing circuit 700.

At the same time, the reflected electromagnetic wave is converted into a third reception signal at the fifth radiating part 110e through the third dielectric lens 300c, and further input to the third input terminal 521c of the third reception circuit 520c. The third reception signal is output as a seventh reception signal from the third reception circuit 520c and input to the signal processing circuit 700.

At the same time, the reflected electromagnetic wave is converted into a fourth reception signal at the sixth radiating part 110f through the third dielectric lens 300c, and further input to the fourth input terminal 521d of the fourth reception circuit 520d. The fourth reception signal is output as an eighth reception signal from the fourth reception circuit 520d and input to the signal processing circuit 700.

The signal processing circuit 700 synthesizes and processes the signals output from the first reception circuit 520a, the second reception circuit 520b, the third reception circuit 520c, and the fourth reception circuit 520d. In other words, the sensor of the present embodiment has one transmission channel and four reception channels, and synthesizes and processes signals of four channels.

The vehicle control circuit 800 recognizes the position of an obstacle or the like and the distance to an obstacle or the like based on the signal output from the signal processing circuit 700, and outputs a control signal to the power train control unit or the vehicle body control unit to control the operation of the moving body according to the surrounding situation. In this way, the vehicle mounted system of the present embodiment functions as a driving support system.

As described above, preferred aspects of the structures and operations of the flat beam generating array antenna according to the present invention, the sensor having the flat beam generating array antenna, and the vehicle mounted system having the sensor have been described using Embodiments 1 to 3. The number of radiating parts constituting the flat beam generating array antenna of the present invention may be different from those of Embodiments 1 to 3 and the effect of the flat beam generating array antenna of the present invention is obtained.

In Embodiments 1 to 3, the first to third dielectric lenses 300a to 300c have convex shapes expanding in the direction of the first to sixth radiating parts 110a to 110f, but the first to third dielectric lenses 300a to 300c may have a convex shape or a double-sided convex shape expanding in the direction opposite to the first to sixth radiating parts 110a to 110f. In addition, the curved surface shapes of the first to third dielectric lenses 300a to 300c may be shapes obtained by combining hyperbolas, rotational hyperbolas, and cylindrical shapes.

The types of the flat beam generating array antenna and the sensor including the flat beam generating array antenna and the number of combinations thereof may be any combination other than the above-described embodiments.

Further, the material constituting the dielectric base plate 100 may be any of a resin material, a ceramic material, and a semiconductor material.

As described above, according to the embodiments of the present invention, a plurality of radiating parts formed on a base plate, a waveguide tube inside of which radio waves emitted from each of the radiating parts propagate, a lens having a plurality of curved surfaces of a substantially hyperbolic shape disposed on an opening of the waveguide tube, and a protruding part formed in a tapered shape between the plurality of radiating parts are included, a tip of the protruding part is formed at a position lower than an opening surface, so it is possible to forma Taylor distribution-like power distribution in which the radio field strength peaks in the vicinity of the center of the dielectric lens and suppress side lobes. Therefore, a high gain can be obtained.

In addition, when the protruding parts are linearly formed, processing is simple and manufacturing cost can be reduced. In addition, when the protruding parts are formed in a curved shape, power gathers easily in the center, and radio waves can be emitted more efficiently.

In addition, since the tip of the protruding part is formed at a position lower than the opening surface by $3\lambda/4$ to $5\lambda/4$, side lobes can be further suppressed.

The opening of the waveguide tube and the lens are formed in a shape in which beams narrower in a second direction than in a first direction, the second direction and the first direction being orthogonal to each other, in a cross section perpendicular to the radiation direction of the beam, the curved surfaces of the lens are disposed side by side in the second direction such that the plurality of beams emitted from lens are synthesized, so the size of the dielectric lens can be reduced and the focal length can be shortened. Therefore, it is possible to reduce the size of the antenna for generating the flat beam. In particular, the depth can be reduced.

In addition, the opening of the waveguide tube and the lens are formed in a shape longer in the second direction than in the first direction, the second direction and the first direction being orthogonal to each other, in a cross section perpendicular to the radiation direction of the beam, and the waveguide tube and the lens are disposed such that the first direction is a horizontal direction and the second direction is a vertical direction, so it is possible to generate a flat beam having a wider horizontal width.

Further, the shape of the opening of the waveguide tube includes at least one linear side. For example, by forming the vicinity of the center linearly, power gathers easily at the center, and radio waves can be emitted more efficiently.

Further, a reference potential part which is formed around the radiating part on the base plate and is a reference potential of the radiating part is included and the reference potential part is electrically connected to the waveguide tube, so the power distribution in the horn can be precisely controlled and the radio field strength in the vicinity of the center of the dielectric lens can be improved.

Further, the lens has curved surfaces of a hyperbolic curve in both of a first direction and a second direction which are orthogonal to each other, in a cross section perpendicular to the radiation direction of the beam, so spherical radio waves emitted from the radiating part can be precisely converted into plane waves.

Further, since the lens is formed on the curved surface of the rotating hyperbolic curve, processing is simple and manufacturing cost can be reduced.

Further, since one side of the lens is formed in a shape obtained by combining any one of a hyperbolic curve, a rotating hyperbolic curve and a curved surface of a cylindrical shape, processing is simple and manufacturing cost can be reduced. Since both surfaces of the lens are formed in a shape obtained by combining any one of a hyperbolic curve, a rotating hyperbolic curve and a curved surface of a cylindrical shape, it is possible to precisely convert spherical radio waves which cannot be completely corrected on one surface into plane waves.

In addition, since a plurality of radiating parts are disposed side by side in the vertical and horizontal directions, obstacles from the horizontal direction and the vertical direction can be detected. For example, forward uphill and obstacle can be detected separately.

Further, since the lens is disposed such that the optical axis of the lens is inclined in the second direction through the radiating part, radio waves can be emitted in directions other than the direction perpendicular to the lens surface with the optical axis of the lens facing the direction other than the direction perpendicular to the lens surface.

It should be noted that the present invention is not limited to the above-described embodiments, but includes various modification embodiments and equivalent structures within the scope of the appended claims. For example, the above-described embodiments have been described in detail in order to explain the present invention in an easy-to-understand manner, and the present invention is not necessarily limited to those having all the configurations described. In addition, a part of the configuration of an embodiment may be replaced by the configuration of another embodiment. Further, the configuration of another embodiment may be added to the configuration of an embodiment. Further, with respect to a part of the configuration of each embodiment, other configurations may be added, deleted, or replaced.

Further, each of the above-described configurations, functions, processing units, processing means, and the like may be realized by hardware, for example, by designing a part or all of them with, for example, an integrated circuit, or may be realized by software by the processor interpreting and executing programs for realizing respective functions.

Information such as programs, tables, and files realizing each function can be stored in a storage device such as a memory, a hard disk, a solid state drive (SSD), or a recording medium such as an IC card, an SD card, and a DVD.

Further, the control lines and the information lines which are considered to be necessary for the explanation are indicated, and it does not necessarily indicate all control lines and information lines necessary for mounting. In fact, it may be considered that almost all constituent elements are interconnected.

The invention claimed is:

1. An antenna comprising:
   a plurality of radiating parts formed on a base plate;
   a waveguide tube inside of which radio waves emitted from the radiating parts propagate;
   a lens having a plurality of curved surfaces, each surface having a hyperbolic shape and the lens disposed in an opening of the waveguide tube; and
   a protruding part formed in a tapered shape between the plurality of radiating parts, wherein
   a tip of the protruding part is formed at a position lower than the opening of the waveguide tube.

2. The antenna according to claim 1, wherein
   the protruding part is formed in a tapered shape in at least one of a linear shape, a curved shape, a hyperbolic shape, and an ellipsoidal sphere shape,
   a cross section of the waveguide tube monotonically expands from the radiating parts to the opening, and
   the waveguide tube is in contact with the lens at the opening opposite to the radiating part.

3. The antenna according to claim 1, wherein
   with a wavelength of the radio wave emitted from the radiating part as $\lambda$, the tip of the protruding part is formed at a position lower than the opening of the waveguide tube by $3\lambda/4$ to $5\lambda/4$.

4. The antenna according to claim 1, wherein
   the opening of the waveguide tube and the lens are formed in a shape in which a plurality of beams are narrower in a second direction than in a first direction, the second direction and the first direction being orthogonal to each other, in a cross section perpendicular to the radiation direction of the plurality of beams, and
   lens curved surfaces are arranged side by side in the second direction such that the plurality of beams emitted from the lens are synthesized.

5. The antenna according to claim 1, wherein
   the opening of the waveguide tube and the lens are formed in a shape longer in a second direction than in a first direction, the first direction and the second direction being orthogonal to each other, in a cross section perpendicular to the radiation direction of the beam, and
   the waveguide tube and the lens are disposed such that the first direction is a horizontal direction and the second direction is a vertical direction.

6. The antenna according to claim 5, wherein
   the shape of the opening of the waveguide tube includes at least one linear side.

7. The antenna according to claim 5, further comprising:
   a reference potential part that is formed around the radiating part on the base plate, the reference potential part being a reference potential of the radiating part, wherein
   the reference potential part is electrically connected to the waveguide tube.

8. The antenna according to claim 1, wherein
   the lens has curved surfaces of a hyperbolic curve in both of a first direction and a second direction which are orthogonal to each other, in a cross section perpendicular to the radiation direction of the beam.

9. The antenna according to claim 1, wherein
   the lens has a curved surface of a rotating hyperbolic curve.

10. The antenna according to claim 1, wherein
    at least one surface of the lens has a shape obtained by combining any one of a hyperbolic curve, a rotating hyperbolic curve and a curved surface of a cylindrical shape.

11. The antenna according to claim 1, wherein
    the plurality of radiating parts are disposed in a planar 2D array in each of a vertical and horizontal direction.

12. The antenna according to claim 1, wherein
    in an opening of the waveguide tube, a first direction defining a short side and a second direction defining a long side are determined, the first direction and the second direction being perpendicular to the radiation direction of the beam, and being orthogonal to each other, and
    the lens is disposed such that the optical axis of the lens is inclined in the second direction through the radiating part.

13. A sensor including the antenna according to claim 1, comprising:
    at least one of a transmission circuit and a reception circuit, wherein
    each of the transmission circuit and the reception circuit is connected to the plurality of radiating parts.

14. The sensor according to claim 13, further comprising:
    a signal processing unit connected to the at least one of the transmission circuit and the reception circuit.

15. A vehicle mounted system including the sensor according to claim 14, comprising:
    a vehicle control unit connected to the signal processing unit.

* * * * *